Jan. 28, 1958   F. H. IMMINK   2,821,019
PASTRY CUTTERS
Filed March 8, 1955
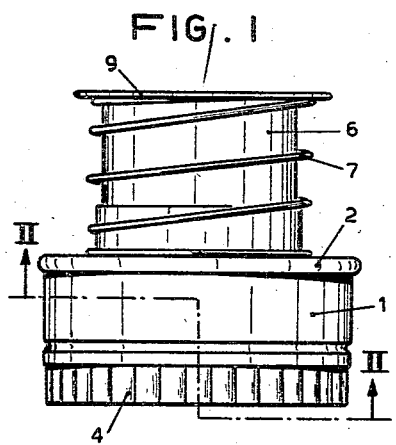
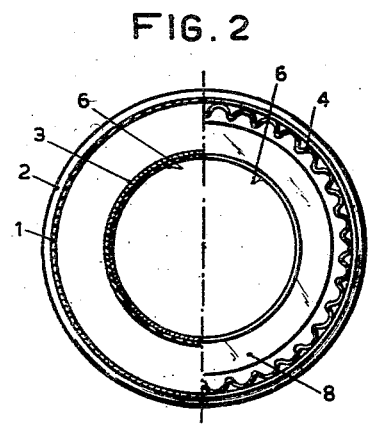
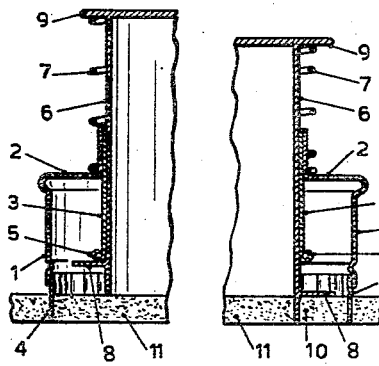
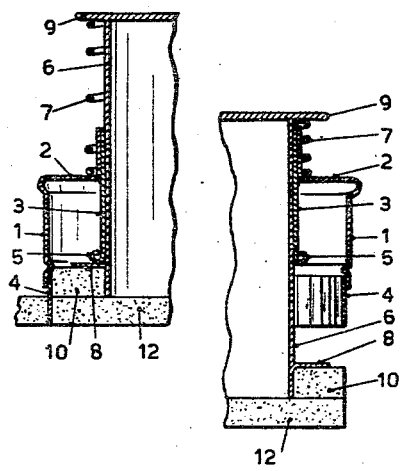
INVENTOR:
FRITS H. IMMINK

United States Patent Office 2,821,019
Patented Jan. 28, 1958

2,821,019

PASTRY CUTTERS

Frits H. Immink, The Hague, Netherlands

Application March 8, 1955, Serial No. 492,920

Claims priority, application Netherlands March 15, 1954

3 Claims. (Cl. 30—301)

This invention relates to a pastry cutter and particularly to a cutter for obtaining pieces of dough consisting of a circular disc and an annular disc placed on said first disc and having the same outer diameter.

When pieces of dough of this kind are subjected to a rising and baking process hollow cylindrical bodies are obtained which may be provided with a filling such as is usual in pastries.

When making pieces of dough of this kind it is difficult to obtain the central hole exactly concentrically with the outer diameter of the annular disc and moreover it is not easy to place the annular disc exactly concentrically on the lower disc. Said displacements of the discs frequently result in a deformation of the pieces of dough during the rising and baking process.

The invention has for its object to remove said drawback and to provide means affording the obtainment from a single layer of dough of a piece of dough the annular disc of which has a concentric hole and is located exactly concentrically on the lower disc. With this and other objects in view a cutter is used comprising two cylinders of different diameter open at their lower end and a sleeve extending into and secured to the larger cylinder, the smaller cylinder being axially slidable in said sleeve and carrying on its outer wall a radially projecting flange spaced from the lower edge of the cylinder and forming an abutment cooperating with the lower edge of said sleeve, spring means being provided urging said smaller cylinder with its flange projection towards the lower end of said sleeve. With said cutter first the annular disc and then the bottom disc are cut out of a sheet of dough and are retained in the lower end of the cutter in superimposed position and ejected by lifting the cutter off the sheet of dough and depressing the inner cylinder against the action of the spring means.

The invention will be further described with reference to the accompanying drawing showing an embodiment of a cutter according to the invention.

Fig. 1 shows the cutter in elevation and Fig. 2 is a view of the under side of the cutter with part of a transverse sectional view taken on the line II—II of Fig. 1.

Figs. 3a to 3d are four diagrammatic longitudinal sectional views of the cutter showing the inner cylinder in different positions relative to the inner cylinder.

The cutter according to the invention is provided with an outer cylinder 1 which is open at its lower end and which has a flange 2 extending radially inwards. To flange 2 a sleeve 3 is secured concentrically with respect to the outer cylinder 1, said sleeve terminating at some distance above the lower end of cylinder 1. The lower end 4 of the cylinder is corrugated in radial direction and the flutes extend in axial direction. Sleeve 3 is beaded at its lower edge 5.

Slidably mounted in sleeve 3 is an inner cylinder 6 open at its lower end and having about twice the length of the outer cylinder 1. A coiled spring 7 surrounding the outwards extending part of cylinder 6 urges said cylinder to its inoperative position shown in Fig. 3a, in which a radially projecting flange 8 secured to the wall of the cylinder at some distance from its lower edge abuts against the bead 5 at the lower end of sleeve 3. Cylinder 6 is closed at its top by a disc 9 secured to the cylinder and projecting radially beyond the wall of the cylinder, said disc 9 together with flange 2 of cylinder 1 forming abutments against which the spring 7 bears.

With the cutter described the cutting opeartion is carried out as follows:

The cutter is placed on a sheet of dough and rotated and simultaneously pressed into the dough, whereby a disc is cut out of the sheet of dough. Thereupon cylinder 6 is pressed downwards against the action of the spring 7 so that it reaches the position shown in Fig. 3b and the central part is cut out of the disc, so that an annular disc 10 of dough is retained between the cylinders 1 and 6 and a disc 11 of dough is retained in the lower end of the inner cylinder 6. In Figs. 3a–3d the discs of dough are shown in suitable shading. If now cylinder 6 is rotated to and fro a few times disc 11 is released from cylinder 6, whereas the annular disc 10 is retained in the cylinder 1 by the corrugations at the lower end 4 thereof, even if cylinder 6 is released and urged to its uppermost position by spring 7.

If now the cutter is taken up the annular disc 10 remains in the cylinder 1 whereas the disc 11 remains still on the sheet of dough. Said disc 11 may be used as cover for the pastry and may be laid on the filling of the pastry after filling same.

Thereupon the cutter is again pressed into the sheet of dough for cutting out the lower disc 12, so that the cutter again reaches the position shown in Fig. 3a, but from Fig. 3c appears that now the annular disc 10 is urged upwards by the lower disc 12. Finally the cutter is again lifted off the sheet of dough and the inner cylinder 6 is completely depressed with respect to sleeve 3, whereby disc 12 with the annular disc 10 lying thereon is removed from the cutter under the action of flange 8 as shown in Fig. 3d and placed on the baking plate.

With the cutter described the pieces of dough required for baking pastries may rapidly be manufactured in large numbers by unskilled labour and the pieces of dough obtained are of uniform shape so that during the rising and baking process they remain straight. The pastries obtained after the baking process have a nice appearance as the corrugations of the annular disc 10 and the lower disc 12 will be aligned exactly.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A pastry cutter for use in connection with a single layer of dough comprising two cylinders each of different diameter than the other and open at their lower ends, a sleeve having a lower edge and extending into and secured to the cylinder of larger diameter, the smaller cylinder being axially slidable in said sleeve and supporting on its outer surface a radially projecting flange, which is spaced from the lower end of said smaller cylinder and forms an abutment cooperable with the lower edge of said sleeve, and spring means provided outside of and between said larger and smaller cylinders tending to move said smaller cylinder in upward direction relative to said larger cylinder and with its radially projecting flange abutting against the lower edge of said sleeve.

2. A pastry cutter comprising two cylinders each of different diameter than the other and open at their lower ends, a sleeve having a lower edge and extending into the larger cylinder, said latter cylinder having a radially inwardly extending flange at its upper end to which said sleeve is secured, said smaller cylinder being axially slidable in said sleeve and being provided at its upper end with a collar extending radially outwardly, said smaller cylinder carrying on its outer surface a radially projecting flange which is spaced from the lower end of said smaller cylinder and forms an abutment cooperable with said lower edge of said sleeve, and a coil spring surrounding said smaller cylinder and bearing at its top against said collar of the smaller cylinder and at its lower end against the flange at the upper end of said larger cylinder.

3. A pastry cutter comprising two cylinders having different diameters and open at their lower ends, a sleeve having a lower edge and extending into and secured to the larger cylinder, the smaller cylinder being axially slidable in said sleeve and carrying on its outer surface and spaced from its lower end a radially projecting flange, which forms an abutment cooperable with the lower edge of said sleeve, said larger cylinder being provided at its lower end with corrugations extending in axial direction, and spring means positioned exteriorly of said cylinders and tending to move said smaller cylinder in upward direction relative to said larger cylinder and with its radially projecting flange abutting against the lower edge of said sleeve.

References Cited in the file of this patent

UNITED STATES PATENTS

| 176,217 | Collins | Apr. 18, 1876 |
| 388,904 | Nash | Sept. 4, 1888 |
| 1,031,243 | Carnes | July 2, 1912 |
| 1,253,836 | Katzinger | Jan. 15, 1918 |
| 1,293,351 | Creasey | Feb. 4, 1919 |

FOREIGN PATENTS

| 466,805 | Germany | Oct. 16, 1928 |